United States Patent
Feero (10) Patent No.: US 10,203,959 B1
(45) Date of Patent: Feb. 12, 2019

(54) SUBROUTINE POWER OPTIMIZTION

(71) Applicant: Apple Inc., Cupertino, CA (US)

(72) Inventor: Brett S. Feero, Austin, TX (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 14/993,627

(22) Filed: Jan. 12, 2016

(51) Int. Cl.
*G06F 9/30* (2018.01)

(52) U.S. Cl.
CPC ...... *G06F 9/30047* (2013.01); *G06F 9/30145* (2013.01)

(58) Field of Classification Search
CPC .................. G06F 9/30047; G06F 9/30145
See application file for complete search history.

(56) References Cited

U.S. PATENT DOCUMENTS

| | | | |
|---|---|---|---|
| 6,826,705 B2* | 11/2004 | Tani ............... | G06F 1/26 713/300 |
| 8,667,257 B2 | 3/2014 | Bhargava et al. | |
| 2004/0181654 A1* | 9/2004 | Chen ............... | G06F 9/30181 712/239 |
| 2008/0082843 A1* | 4/2008 | Schuler ............ | G06F 9/3806 713/323 |
| 2009/0132766 A1* | 5/2009 | Whalley .......... | G06F 12/0897 711/125 |
| 2012/0079303 A1* | 3/2012 | Madduri .......... | G06F 1/3203 713/324 |
| 2013/0290640 A1 | 10/2013 | Aggarwal et al. | |
| 2013/0339698 A1* | 12/2013 | Bonanno ......... | G06F 9/30076 712/239 |
| 2014/0143494 A1* | 5/2014 | Whalley .......... | G06F 12/0862 711/122 |
| 2014/0143522 A1 | 5/2014 | Saidi et al. | |
| 2015/0169041 A1* | 6/2015 | Blasco ............. | G06F 9/3802 713/320 |
| 2015/0370308 A1* | 12/2015 | Hickey ............ | G06F 1/324 713/322 |

* cited by examiner

*Primary Examiner* — Andrew Caldwell
*Assistant Examiner* — Michael J Metzger
(74) *Attorney, Agent, or Firm* — Meyertons, Hood, Kivlin, Kowert & Goetzel, P.C.

(57) ABSTRACT

Techniques are disclosed relating to reducing power consumption of a branch prediction unit. In one embodiment, an integrated circuit includes an instruction fetch unit configured to fetch a set of instructions that includes a call instruction. The instruction fetch unit is further configured to determine whether the set of instructions includes a first type of branch instruction after the call instruction, and in response to determining that the set does not include the first type of branch instruction, to disable a first branch predictor circuit configured to predict an execution result of the first type of branch instruction. In various embodiments, the instruction fetch unit is configured to determine that the set of instructions includes a second type of branch instruction after the call instruction, and in response, enable a second branch predictor circuit configured to predict an execution result of the second type of branch instruction.

17 Claims, 6 Drawing Sheets

SUBROUTINE POWER OPTIMIZTION

BACKGROUND

Technical Field

This disclosure relates generally to processors, and, more specifically, to reducing power consumption of branch prediction units.

Description of the Related Art

Power consumption is a common concern in integrated circuit design and can be particularly important in mobile devices such as smart phones, tablets, laptop computers, etc. These mobile devices often rely on battery power, and reducing power consumption in the integrated circuits can increase the life of the battery power. Additionally, reducing power consumption can reduce the heat generated by the integrated circuit, which can reduce cooling requirements.

Modern processors typically include a branch prediction unit that attempts determine the direction of control flow when branch instructions are included in an instruction sequence. For example, a branch prediction unit may maintain branch history information for conditional branch instructions and attempt to predict directions of the instructions (e.g., taken or not taken) prior to their executions. An instruction fetch unit may use these predictions to determine which instructions to fetch next (as opposed to waiting until the instructions actual complete execution). While a branch prediction unit can significantly improve instruction throughput, its power consumption can account for a significant portion of a processor's overall power consumption.

SUMMARY

The present disclosure describes embodiments in which an integrated circuit is configured to reduce the power consumption of a branch prediction unit. In one embodiment, the integrated circuit includes a decode circuit configured to analyze instructions being fetched by an instruction fetch unit. In such an embodiment, the decode circuit is configured to identify a call instruction included in a set of fetched instructions, and to determine whether the set includes at least one branch instruction after the call instruction in program order. If the set does not include any branch instructions after the call instruction, the decode circuit is configured to cause a branch predictor unit to be disabled for one or more instructions in the set that are after the call instruction in program order.

In some embodiments, the decode circuit is further configured to determine the types of branch instructions present after a call instruction. If a particular type of branch instruction is not present after a call instruction, the decode circuit is configured to disable the circuitry in the branch prediction unit that is responsible for predicting an outcome of that type of branch instruction.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "instruction fetch unit configured to fetch a set of instructions from memory" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application-programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having multiple branch predictor circuits, the terms "first" and "second" can be used to refer to any branch predictor circuit.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes embodiments pertaining to the execution of branch instructions. Before commencing discussion of these embodiments, a discussion of terminology is presented. As used herein, the term "control transfer instruction" is to be interpreted according to its understood meaning in the art, and includes a program instruction that is executable to change the order in which program instructions are executed (also referred to as control flow). Control transfer instructions, for example, include jump instructions, conditional branch instructions, call instructions, return instructions, trap instructions, etc. As used herein, the term "branch instruction" is used generally to refer to any control transfer instruction. As used herein, the "branch prediction unit" is to be interpreted according to its understood meaning in the art, and includes circuitry configured to predict an outcome (i.e., an execution result) of a branch instruction. As used herein, the term "call instruction" is to be interpreted according to its understood meaning in the art, and includes a control transfer instruction that specifies (either directly or indirectly) an address associated with a subroutine and causes a processor to begin execution of the subroutine at the specified address.

In some instances, a sequence of program instructions may include a call instruction that invokes a subroutine. A subroutine typically concludes with a corresponding return instruction that causes a processor to resume executing instructions that come after the call instruction in program order. (As used herein, the term "program order" is to be interpreted according to its understood meaning in the art, and includes the way in which instructions are ordered within a program. In some instances, a processor may execute instructions in order that is different from program order and commonly referred to as "out-of-order" execution (OoOE).) If the instructions coming after the call instruction include a branch instruction, a branch prediction unit may need to be available to predict the outcome of the branch instruction when the processor returns from executing the subroutine.

Making a branch prediction unit available for potential branch instructions, which may (or may not) exist after a call instruction in program order, can consume a considerable amount of power. The present disclosure, however, describes embodiments in which a branch prediction unit (or portions of the branch prediction unit) may be disabled for a set of instructions that includes a call instruction in response to determining that the set of instructions does not include any branch instruction located after the call instruction. As will be described in further detail, in various embodiments, an integrated circuit may include a decode circuit that is configured to analyze instructions being fetched by an instruction fetch unit to identify call instructions. (As used herein, the term "instruction fetch unit" is to be interpreted according to its understood meaning in the art, and includes circuitry configured to fetch instructions from memory for execution in an execution pipeline.) Upon identifying a call instruction, the decode circuit may scan forward in the program sequence to determine whether any branch instructions are present. If the decode circuit does not detect any branch instructions within a given window, the decode circuit may cause a branch prediction unit to be disabled for the window when the integrated circuit returns from executing a subroutine. In doing so, the integrated circuit may achieve considerable power savings. In some embodiments, the decode circuit's analysis may also be used to limit the number of instructions that are issued from an instruction cache, which can achieve additional power savings.

Figure 1:
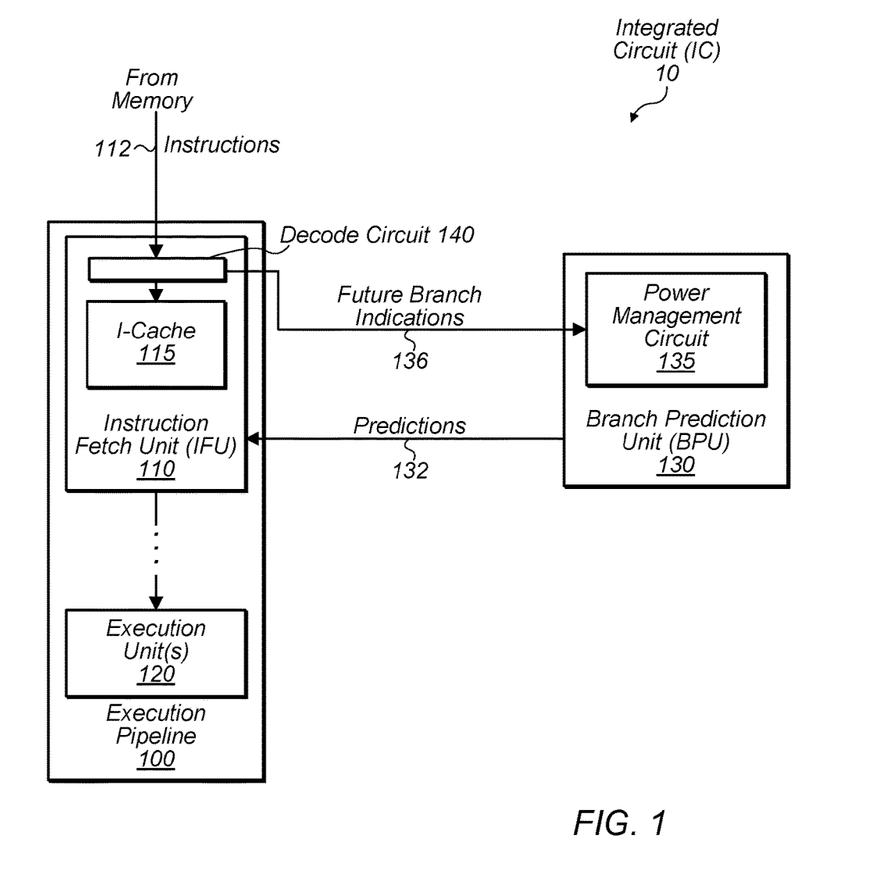
FIG. 1 is a block diagram illustrating one embodiment of an integrated circuit configured to reduce power consumption of a branch prediction unit.

Turning now to FIG. 1, a block diagram of an integrated circuit (IC) 10 configured to reduce branch-prediction power consumption is depicted. In the illustrated embodiment, IC 10 includes an execution pipeline 100, which includes an instruction fetch unit 110 and one or more execution units 120. In such an embodiment, instruction fetch unit 110 includes an instruction cache 115 and a decode circuit 140. IC 10 also includes a branch prediction unit 130, which includes a power management circuit 135. In some embodiments, IC 10 may be implemented differently than shown. Accordingly, in some embodiments, branch prediction unit 130 may be a part of instruction fetch unit 110. In some embodiments, IC 10 may include multiple execution pipelines 100, which may be included in multiple processor cores within IC 10. In various embodiments, execution pipeline 100 may include additional pipeline stages such as decode, issuance, and/or commit stages. In some embodiments, IC 10 may include additional components such as those discussed below with respect to FIG. 5.

Instruction fetch unit 110 (IFU), in one embodiment, is circuitry configured to fetch instructions 112 that are loaded into pipeline 100. In various embodiments, IFU 110 retrieves instructions 112 from a memory (e.g., a higher-level cache or RAM) and stores the instructions in an instruction cache (i-cache) 115 until they can be issued to subsequent stages in pipeline 100. In some embodiments, IFU 110 is configured to retrieve blocks of multiple instructions 112 (as opposed to retrieving one instruction 112 at a time). For example, in one embodiment, IFU 110 may fetch a set of sixteen instructions each clock cycle from memory. In some embodiments, the size of a fetched instruction block may correspond to the size of a cache line in cache 115—i.e., the storage capacity of a given cache line may be the same size as the number of bytes making up the instruction block.

Execution units 120, in one embodiment, are circuitry configured to perform operations specified by instructions 112. Accordingly, an execution unit 120 may be configured to receive a set of operands identified by an instruction 112 and perform the operation indicated by the opcode of the instruction 112. In various embodiments, execution units 120 may include arithmetic logic units (ALU), load/store units, floating-point units, etc. Executions units 120 may also include logic for determining the outcome of branch instructions.

Branch prediction unit (BPU) 130, in one embodiment, is circuitry configured to predict the outcomes of branch instructions (as determined by one or more execution units 120). As shown, BPU 130 may indicate its predictions 132 to IFU 110, which may use predictions 132 to determine which instructions 112 to fetch and/or to determine which instructions to pass to subsequent stages in pipeline 100. In some embodiments, branch prediction unit 130 includes multiple branch predictor circuits each configured to predict outcomes for a particular type of branch instruction. As used herein, the term "type of branch instruction" refers to a branch instruction having a particular opcode. Accordingly, different types of branch instructions have different respective opcodes. For example, as will be discussed with FIG. 3, in some embodiments, BPU 130 may include predictors for different types of branch instructions such as return instructions, conditional branch instructions, and indirect branch instructions. As used herein, the term "conditional branch instruction" is to be interpreted according to its understood meaning in the art, and includes an instruction that changes control flow based on a condition being satisfied. For example, the x86 instruction JE 0x89AB is a conditional branch instruction that causes a processor to jump to a particular target address if two values are equal as specified by its opcode. (In contrast, an "unconditional branch instruction" is an instruction that changes control flow without any assessment of a condition.) As used herein, the term "indirect branch instruction" is to be interpreted according to its understood meaning in the art, and includes a control transfer instruction that does not explicitly specify a target address or offset, but rather specifies a storage element (e.g., a register, memory, etc.) that includes the target address or offset. The x86 instruction JMP EAX is one example of an indirect branch instruction, which is executable to cause a processor to load a program counter register with the address stored in register EAX and begin executing instructions from that address. (JMP EAX is also an unconditional branch instruction as it changes control flow without testing any condition.)

Power management circuit 135, in one embodiment, is configured to enable and disable circuitry in BPU 130 in order to reduce the power consumption of BPU 130. As will be discussed below, in some embodiments, circuit 135 may be configured to disable circuitry by reducing the voltage supplied to this circuitry and/or preventing logic from being driven that determines that outcome of branch instructions. In the illustrated embodiment, circuit 135 may disable or enable circuitry based on future branch indications 136 provided by decode circuit 140 (or more generally, IFU 110).

Decode circuit 140, in one embodiment, is configured to decode instructions 112 in order to determine metadata about instructions. Accordingly, circuit 140 may be configured to analyze opcodes specified by instructions in order to determine the type of instructions. Decode circuit 140 may also analyze operand information specified by instructions and/or other information about instructions 112. In the illustrated embodiment, decode circuit 140 analyzes instructions 112 before they are stored in cache 115; however, in other embodiments, decode circuit 140 may analyze instructions 112 after they are retrieved from cache 115. In various embodiments, the decoding performed by decode circuit 140 is distinct from the decoding performed by a decode stage located after IFU 110 in the pipeline 100.

As noted above, in various embodiments, decode circuit 140 is configured to analyze a set of instruction 112 fetched by IFU 110 in order to identify any call instructions that may be present in the set. If a call instruction is identified, decode circuit 140 may scan forward in program order to determine whether any subsequent branch instructions exist. In some embodiments, the window in which decode circuit 140 scans forward corresponds to the size of the instruction block being fetched by IFU 110 (which may also correspond to the size of a cache line). For example, in one embodiment in which the block size is sixteen instructions, decode circuit 140 may scan up to sixteen instructions. If the scanning does not identify any branch instructions after the call instruction, decode circuit 140 may indicate this to BPU 130 in order to cause BPU 130 to be disabled for the instructions in the scan window. In other words, because there are no branch instructions after the call instruction in the scan window, BPU 130 can be disabled for the remainder of the window, as there are no branch instructions that warrant predictions 132. In some embodiments discussed below, decode circuit 140 may also cause BPU 130 to be disabled if circuit 140's scanning identifies an unconditional branch instruction located before any other types of branch instructions. As noted above, disabling BPU 130 for this window can offer considerable power savings. In the illustrated embodiment, decode circuit 140 indicates the presence of branch instructions by providing future branch indications 136 to power management circuit 135.

As will be described in greater detail with respect to FIGS. 2A and 3, in some embodiments, decode circuit 140 is configured to not only indicate the presence of branch instructions after a call instruction, but also indicate the types of branch instructions that are present (or not present) after a call instruction. For example, decode circuit 140 may detect that a set of instructions includes a conditional branch instruction after a call instruction, but does not include any indirect branch instructions after the call. Decode circuit 140 may then provide indications 136 identifying the presence of a conditional branch instruction and the lack of any indirect branch instructions for the scan window. In response to receiving these indications 136, in some embodiments, BPU 130 is configured to disable a branch predictor circuit responsible for predicting outcomes of indirect branch instructions, but enable another branch predictor circuit responsible for predicting outcomes of conditional branch instructions. Thus, when execution returns from subroutine, BPU 130 may obtain some power savings for instructions in the scan window because at least a portion of BPU 130 is disabled—i.e., the unused indirect-branch predictor circuit.

In some embodiments, decode circuit 140's analysis may also be used by IFU 110 to reduce the number of instructions issued from i-cache 115 to subsequent pipeline stages (e.g., execution units 120) in order to achieve additional power savings. As will be described below with respect to FIG. 2B, when decode circuit 140 scans forward after identifying a call instruction, decode circuit 140 may be configured to determine whether any unconditional branch instructions are located after the call instruction in the scan window. If an unconditional branch instruction is identified, in some embodiments, decode circuit 140 may indicate this to IFU 110 and identify the number of instructions located between the call instruction and the unconditional branch instruction. When the program returns from the subroutine, in some embodiments, IFU 110 is configured to issue the identified instructions and the unconditional branch instruction, but not any instructions located after the unconditional branch instructions in the scan window. Notably, because execution of the unconditional branch instruction results in a changed control flow, these later instructions will not be executed upon return due to their location. As a result, reading them from i-cache 115 unnecessarily consumes energy. By not reading and issuing these instructions from i-cache 115 upon return, in some embodiments, IFU 110 is able to obtain some additional power savings.

As noted above, IC 10 may be implemented differently than shown in FIG. 1 in some embodiments. For example, in one embodiment, IC 10 does include a decode circuit 140 for determining when branch instructions are present after call instructions. Rather, IC 10 may execute a sequence of instructions and determine, from this initial iteration, whether branch instructions are present in the sequence after a call instruction. IC 10 may then store information about this determination, so it can be used for subsequent iterations in which the sequence is executed. Thus, while power savings for BPU 130 may not be obtained on the first iteration, the information gleaned from this iteration can be used to save power in subsequent iterations.

Figure 2A:
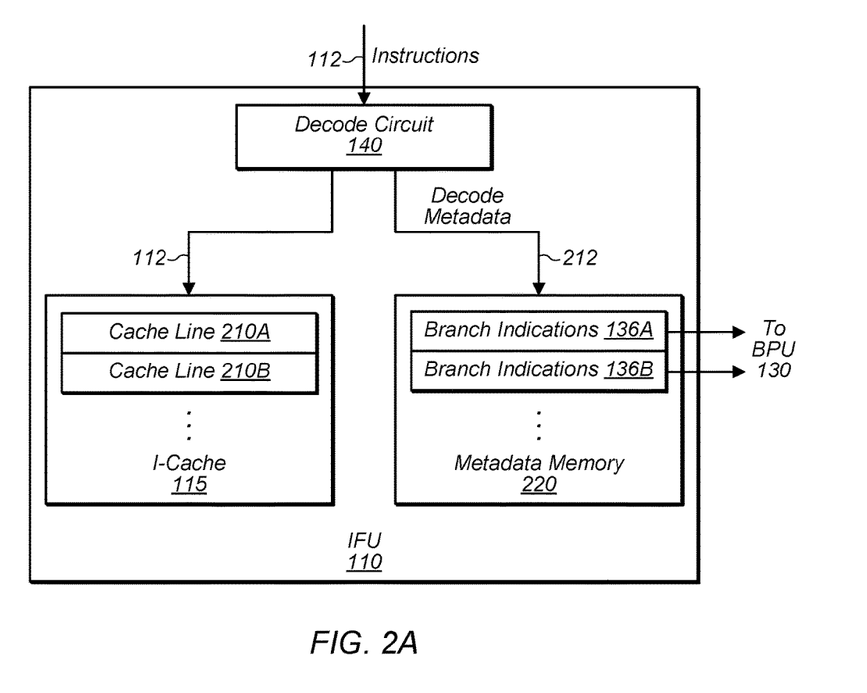
FIGS. 2A and 2B are block diagrams illustrating embodiments of an instruction fetch unit in the integrated circuit.

Turning now to FIG. 2A, a block diagram of instruction fetch unit (IFU) 110 is shown. As noted above, IFU 110 may include I-cache 115 and decode circuit 140. In the illustrated embodiment, IFU 110 also includes a metadata memory 220. In some embodiments, IFU 110 may be implemented differently than shown.

As noted above, in some embodiments, decode circuit 140 is configured to analyze fetched instructions 112 as they are being stored in I-cache 115, where a given cache line 210 may store an entire block of fetched instructions 112. As also noted, decode circuit 140 may analyze instructions on a per block basis. When decode 140 analyzes a block, in the illustrated embodiment, decode circuit 140 writes decode metadata 212 for that instruction block into metadata memory 220. In some embodiments, the particular entry in memory 220 may correspond directly to a particular cache line 210 in I-cache 115.

Metadata memory 220, in one embodiment, is memory configured to store metadata about instructions 112 including branch indications 136 In some embodiments, memory 220 is an S-RAM distinct from I-cache 115. When decode circuit 140 analyses a fetched instruction block, in various embodiments, decode circuit 140 is configured to generate a set of indications 136, each pertaining to a particular type of branch instruction which may be present after a call instruction in block. For example, in some embodiments, branch indications 136A include a first value (e.g., a bit) indicating whether a conditional branch instruction is present in the instructions of cache line 220A and a second value indicating whether an indirect branch instruction is present in the instructions of cache line 210A. Branch indications 136, however, may be specified in any suitable manner.

In the illustrated embodiment, branch indications 136 are provided to BPU 130 from memory 220 (as opposed to decode circuit 140 providing indications 136 directly to BPU 130). In some embodiments, IFU 110 is configured to convey branch indications 136 for a given block to BPU 130 in response to a call instruction in the block being retrieved from I-cache 115. As will be discussed next with FIG. 3, IFU 110 may also provide a return address associated with the call instruction instruction (e.g., the address of the instruction directly after the call instruction).

Figure 2B:
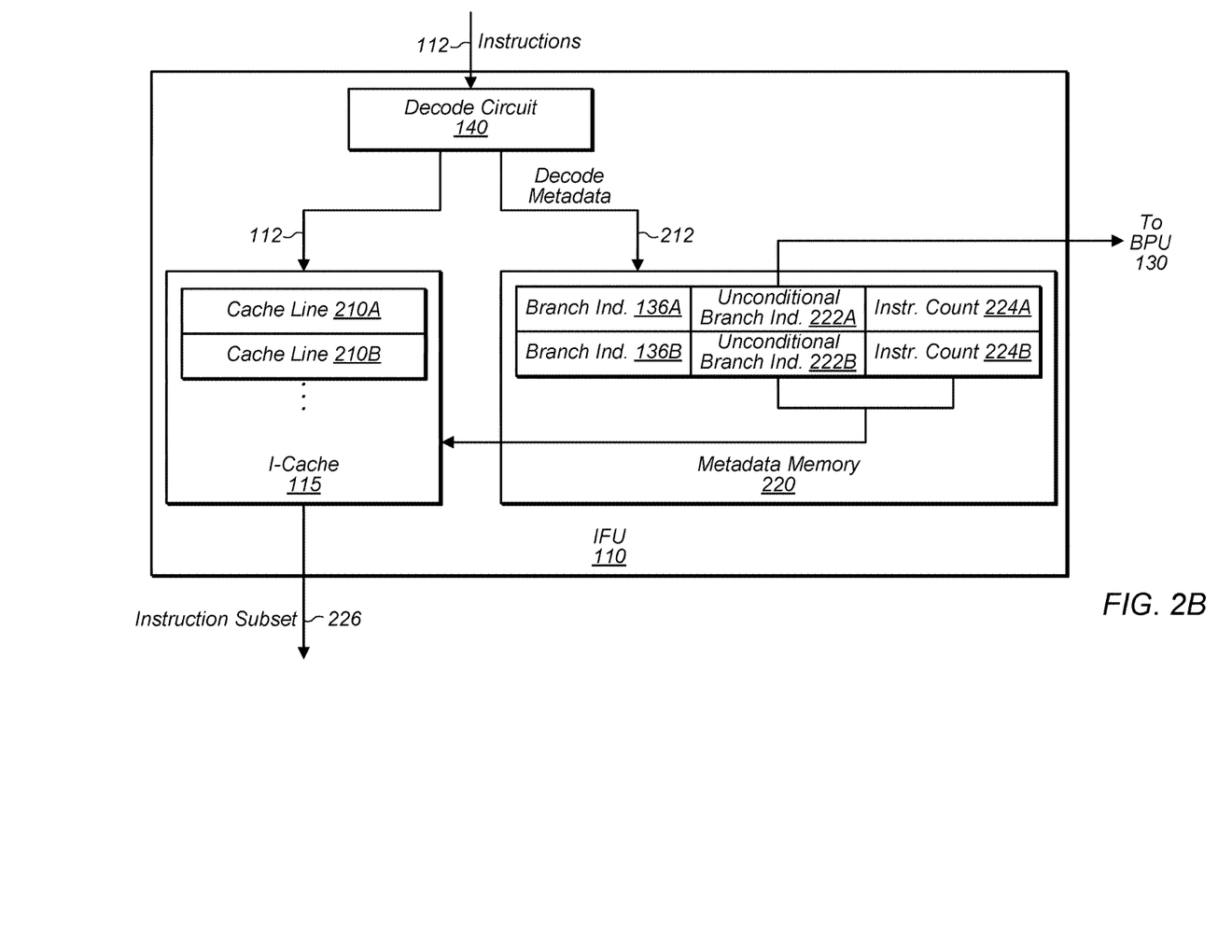

Turning now to FIG. 2B, a block diagram of another embodiment of IFU 110 is depicted. As noted above, in some embodiments, IFU 110 is configured to reduce the number of instructions issued from i-cache 115 based on decode circuit 140's analysis of instructions 112. Accordingly, in the illustrated embodiment, decode circuit 140 is configured to produce, from its analysis, decode metadata 212 that includes unconditional branch indications 222 and instruction counts 224, which are stored in metadata memory 220.

Unconditional branch indications 222, in one embodiment, specify whether an unconditional branch instruction has been identified after a call instruction in the scanned window. As noted above, in some embodiments, this scan window corresponds to the instructions stored in a given cache line. Thus, indication 222A may indicate whether an unconditional branch instruction is present after a call instruction in cache line 210A. In some embodiments, indications 222 may also identify the location of an unconditional branch instruction within the cache line.

Instruction counts 224, in one embodiment, indicate the number of instructions located between a call instruction and an identified unconditional branch instruction. As shown, instruction counts 224 may also be specified on a per-cache-line basis. Thus, count 224 may indicate that number of instructions located between a call instruction and an unconditional branch instruction in cache line 210A.

In some embodiments, IFU 110 is configured to selectively issue instructions 112 from i-cache 115 based on indications 222 and counts 224. That is, if an indication 222 for a cache line 210 indicates the presence of an unconditional branch instruction, in such an embodiment, IFU 110 is configured to issue the instructions located between the call instruction and the unconditional branch instruction (as indicated by 224) from the cache line 210, but not the instructions in the cache line 210 located after the unconditional branch instruction. In other words, IFU 110 is configured to issue a subset 226 of the instructions from a given cache line 210. As noted above, issuing only a subset of the instructions may result in less power being used than if the entire cache line 210 is issued to subsequent stages in pipeline 100.

In some embodiments, unconditional branch indications 222 may also be provided to BPU 130 as shown. In such an embodiment, if an indication 222 specifies that an unconditional branch instruction is present after a call instruction, BPU 130 may be disabled even if additional branch instructions are identified by indications 136 as long as these branch instructions are located after the unconditional branch instruction in program order as these instructions do not warrant predictions since they are not executed when the unconditional branch instruction changes control flow. In some embodiments, indications 222 and/or counts 224 may be stored in a return address stack of BPU 130 discussed next.

Figure 3:
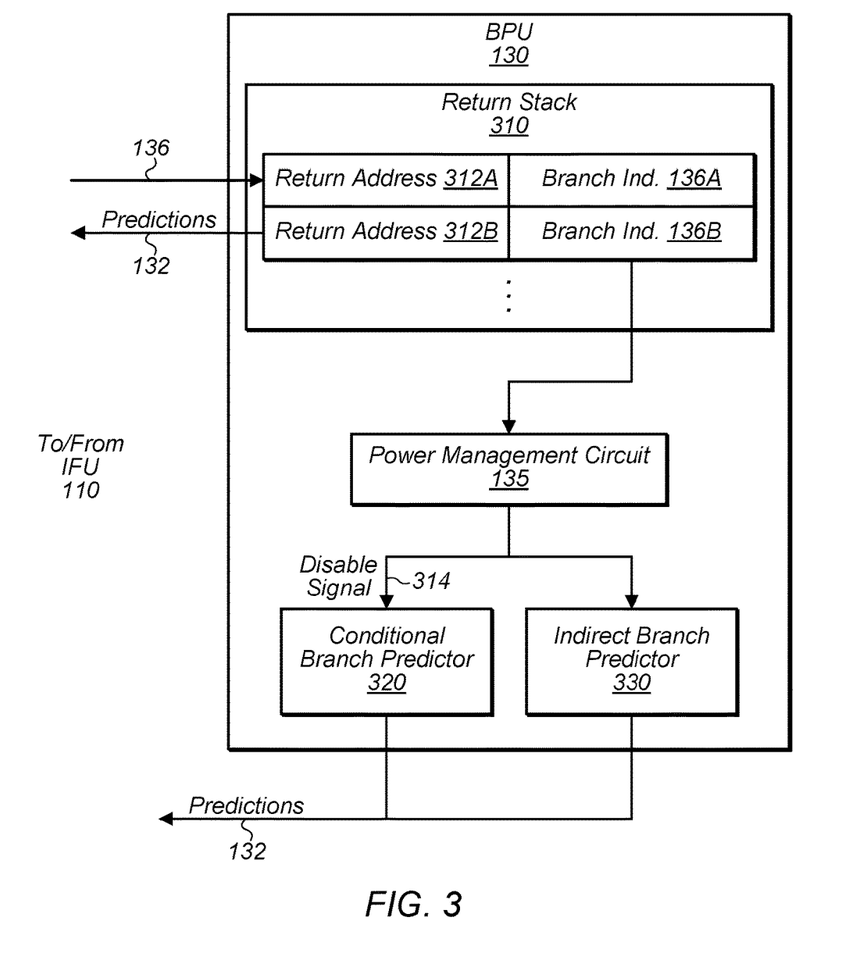
FIG. 3 is a block diagram illustrating one embodiment of a branch prediction unit in the integrated circuit.

Turning now to FIG. 3, a block diagram of branch prediction unit (BPU) 130 is depicted. In the illustrated embodiment, BPU 130 includes a return address stack (RAS) 310, power management circuit 135, conditional branch predictor 320, and indirect branch predictor 330. In some embodiments, BPU 130 may include more (or less) components than shown.

Return stack 310, in one embodiment, is circuitry configured to predict the outcomes of return instructions by storing potential return addresses for the return instructions. As noted above, when a call instruction is issued from I-cache 115, IFU 110 may provide the potential return address for that call instruction, which may be pushed onto return stack 310. Later, return stack 310 may provide the return address 312 as a prediction 132 to IFU 110 so that it can fetch the appropriate instructions for the return instruction in the called subroutine.

As shown, in various embodiments, return stack 310 is also configured to store branch indications 136 received from IFU 110. In some embodiments, these indications 136 are stored in stack 310 when the corresponding return address 312 is received. A set of indications 136 may then be provided to power management circuit 135 when the corresponding return address 312 is pulled from the stack 310 in order to determine which branch predictors (e.g., predictors 320 and 330) are to be disabled when execution returns from the called subroutine.

Conditional branch predictor 320, in one embodiment, is circuitry configured to predict the outcomes of conditional branch instructions. In various embodiments, predictor 320 includes a table/memory configured to store branch history information associated with previously executed conditional branch instructions. In some embodiments, this history information may include local history information indicative of whether a conditional branch instruction was taken (or not taken) as well as global history information indicative of the outcomes of, not only that branch instruction, but also a set of previous branch instructions in program order. In some embodiments, predictor 320 may be configured to search this memory for each value of a program counter regardless of whether the value of the program counter corresponds to an address of a conditional branch instruction. In some embodiments, predictor 320 may also be configured such that a particular operating voltage is needed to search the memory; however, a lesser voltage may be needed to merely maintain the state of the memory.

Indirect branch predictor 330, in one embodiment, is circuitry configured to predict the outcomes of indirect branch instructions. In some embodiments, predictor 330 also includes a table/memory that stores target addresses associated with previously executed indirect branch instructions. Like predictor 320, predictor 330 may be configured to search this memory for each value of a program counter regardless of whether the value of the program counter corresponds to an address of an indirect branch instruction. Predictor 330 may also be configured such that a particular operating voltage is needed to search the memory; however, a lesser voltage may be needed to merely maintain the state of the memory.

In the illustrated embodiment, power management circuit 135 is configured assert a disable signal 314 for conditional branch predictor 320 and/or indirect branch predictor 330 based on branch indications 136 indicating the presence of branch instructions. More specifically, in various embodiments, if a branch indication 136 specifies that a conditional branch instruction is not present, circuit 135 asserts signal 314 to disable predictor 320 for the instructions located after the call instruction in the scanned window. In such an embodiment, if a branch indication 136 specifies that indirect branch instruction is not present, circuit 135 asserts signal 314 to disable predictor 330 for the instructions located after the call instruction in the scanned window. In some embodiments, disabling predictors includes preventing them from indexing into their respective memory. In one embodiment, this prevention may include clock gating predictors 320 and 330. In some embodiments, disabling predictors 320 and 330 includes lowering their supplied voltages so that their memories can still maintain state, but would not be able to correctly perform indexes into the memories. In doing so, power management circuit may reduce the power consumptions of predictors 320 and 330 (and thus the power consumption of BPU 130).

Figure 4:
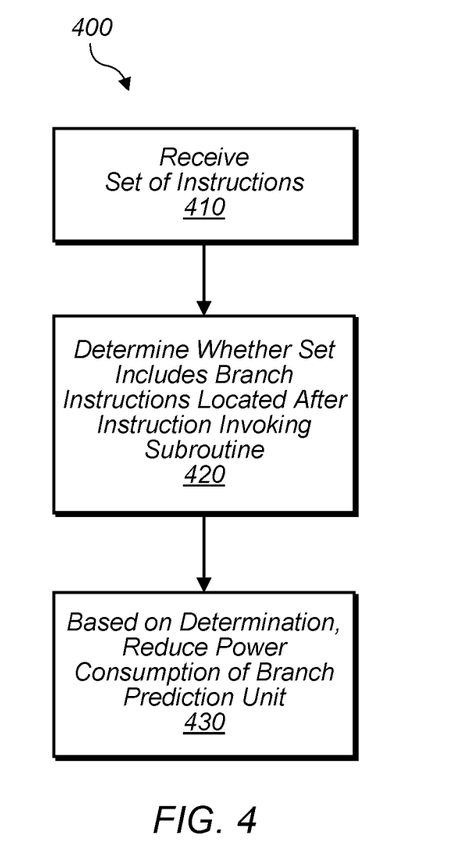
FIG. 4 is a flow diagram illustrating one embodiment of a method for reducing power consumption of a branch prediction unit.

Turning now to FIG. 4, a flowchart diagram of a method 400 is depicted. Method 400 is one embodiment of method for reducing power consumption of a branch prediction unit. In some embodiments, method 400 may be performed by a processor having a branch prediction unit such as IC 10 discussed above.

In step 410, a processor receives a set of instructions (e.g., instructions 112) including an instruction that invokes a subroutine (e.g., a call instruction). In some embodiments, the processor stores the set of instructions in a cache line (e.g., cache line 210) of an instruction cache, where a size of the set of instructions is the same as a size of the cache line.

In step 420, the processor (e.g., using decode circuit 140) determines whether the set of instructions includes any branch instructions located after the instruction in program order. In some embodiments, step 420 includes identifying a type of branch instruction determined to be located after the instruction that invokes the subroutine.

In step 430, the processor reduces power consumption of a branch prediction unit (e.g., branch prediction unit 130) based on the determining. In some embodiments, step 430 includes disabling circuitry in the branch prediction unit (e.g., conditional branch predictor 320 or indirect branch predictor 330) that is used to predict an outcome of a type of branch instruction that is different from the identified type. In some embodiments, step 430 includes the processor writing a value (e.g., a branch indication 136) into a return stack (e.g., return stack 310) of the branch prediction unit. In such an embodiment, the value indicates whether a branch instruction exists after the call instruction and is usable by the branch prediction unit to disable circuitry in the branch prediction unit.

Exemplary Computer System

Figure 5:
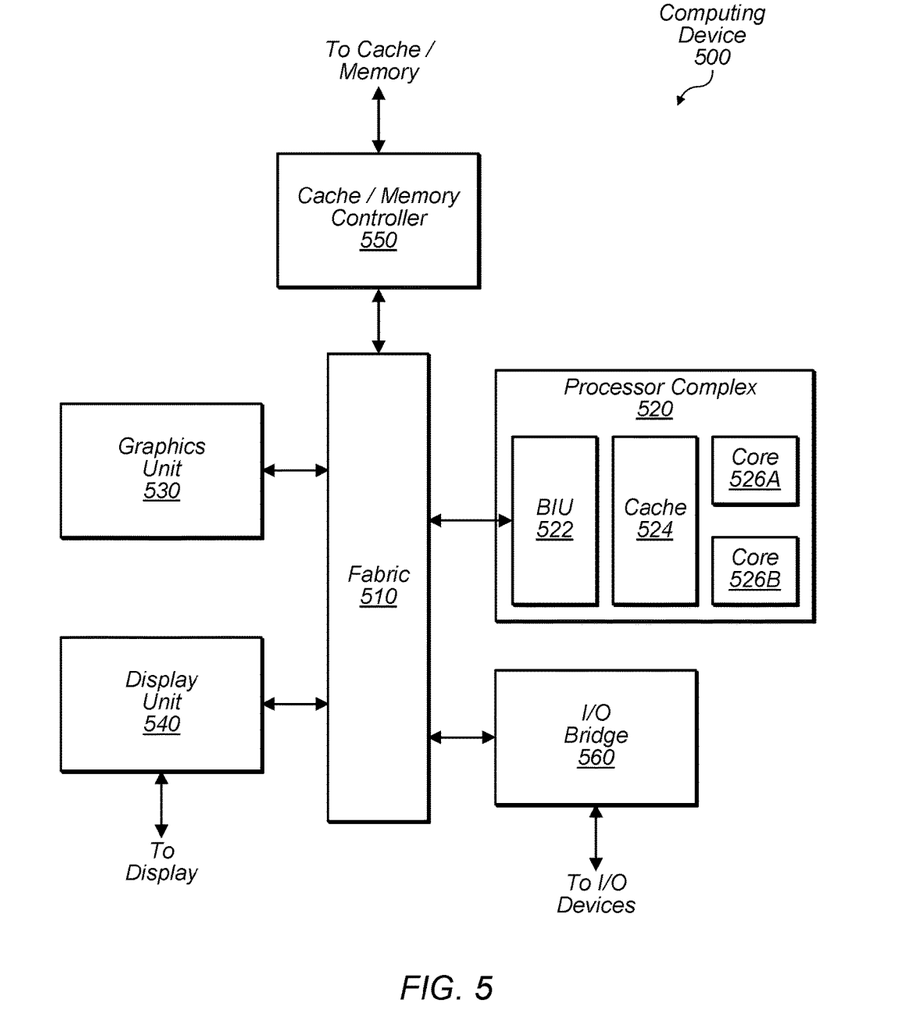
FIG. 5 is a block diagram illustrating one embodiment of an exemplary computer system, which may include the integrated circuit.

Turning now to FIG. 5, a block diagram illustrating an exemplary embodiment of a device 500 is shown. As noted above, in some embodiments, integrated circuit 10 may be included in (or correspond to) computing device 500. In some embodiments, elements of device 500 may be included within a system on a chip (SOC). In some embodiments, device 500 may be included in a mobile device, which may be battery-powered. Therefore, power consumption by device 500 may be an important design consideration. In the illustrated embodiment, device 500 includes fabric 510, processor complex 520, graphics unit 530, display unit 540, cache/memory controller 550, input/output (I/O) bridge 560.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally. As used herein, the term "coupled to" may indicate one or more connections between elements, and a coupling may include intervening elements. For example, in FIG. 5, graphics unit 530 may be described as "coupled to" a memory through fabric 510 and cache/memory controller 550. In contrast, in the illustrated embodiment of FIG. 5, graphics unit 530 is "directly coupled" to fabric 510 because there are no intervening elements.

In the illustrated embodiment, processor complex 520 includes bus interface unit (BIU) 522, cache 524, and cores 526A and 526B. In various embodiments, processor complex 520 may include various numbers of processors, processor cores and/or caches. For example, processor complex 520 may include 1, 2, or 4 processor cores, or any other suitable number. In one embodiment, cache 524 is a set associative L2 cache. In some embodiments, cores 526A and/or 526B may include internal instruction and/or data caches. In some embodiments, a coherency unit (not shown) in fabric 510, cache 524, or elsewhere in device 500 may be configured to maintain coherency between various caches of device 500. BIU 522 may be configured to manage communication between processor complex 520 and other elements of device 500. Processor cores such as cores 526 may be configured to execute instructions of a particular instruction set architecture (ISA) which may include operating system instructions and user application instructions. In some embodiments, integrated circuit 10 is processor complex 520 (or a core 526).

Graphics unit 530 may include one or more processors and/or one or more graphics processing units (GPU's). Graphics unit 530 may receive graphics-oriented instructions, such as OPENGL®, Metal, or DIRECT3D® instructions, for example. Graphics unit 530 may execute specialized GPU instructions or perform other operations based on the received graphics-oriented instructions. Graphics unit 530 may generally be configured to process large blocks of data in parallel and may build images in a frame buffer for output to a display. Graphics unit 530 may include transform, lighting, triangle, and/or rendering engines in one or more graphics processing pipelines. Graphics unit 530 may output pixel information for display images.

Display unit 540 may be configured to read data from a frame buffer and provide a stream of pixel values for display. Display unit 540 may be configured as a display pipeline in some embodiments. Additionally, display unit 540 may be configured to blend multiple frames to produce an output frame. Further, display unit 540 may include one or more interfaces (e.g., MIPI® or embedded display port (eDP)) for coupling to a user display (e.g., a touchscreen or an external display).

Cache/memory controller 550 may be configured to manage transfer of data between fabric 510 and one or more caches and/or memories. For example, cache/memory controller 550 may be coupled to an L3 cache, which may in turn be coupled to a system memory. In other embodiments, cache/memory controller 550 may be directly coupled to a memory. In some embodiments, cache/memory controller 550 may include one or more internal caches. Memory coupled to controller 550 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 550 may be any type of non-volatile memory such as NAND flash memory, NOR flash memory, nano RAM (NRAM), magneto-resistive RAM (MRAM), phase change RAM (PRAM), Racetrack memory, Memristor memory, etc.

I/O bridge 560 may include various elements configured to implement universal serial bus (USB) communications, security, audio, and/or low-power always-on functionality, for example. I/O bridge 560 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 560. For example, these devices may include various types of wireless communication (e.g., wifi, Bluetooth, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An integrated circuit, comprising:
a decode circuit configured to:
identify a call instruction included in a set of fetched instructions, wherein the call instruction causes execution of a subroutine having a return instruction;
prior to executing the call instruction, determine whether the set includes at least one branch instruction after the call instruction in program order; and
in response to determining that the set does not include at least one branch instruction after the call instruction, cause a branch predictor circuit to be disabled after returning from the subroutine for one or more instructions in the set that are after the call instruction in program order, wherein the decode circuit is configured to cause the branch predictor circuit to be disabled by writing, into a return stack, a respective value corresponding to a return address of the return instruction, wherein the return stack is configured to predict the return address of the return instruction.

2. The integrated circuit of claim 1, further comprising:
an instruction fetch unit configured to:
fetch the set of instructions from memory; and
store the set of fetched instructions in one or more cache lines of an instruction cache.

3. The integrated circuit of claim 2, wherein the decode circuit is configured to:
analyze the set of fetched instructions prior to the instruction fetch unit storing the set in the one or more cache lines, wherein analyzing the set includes identifying the call instruction and determining that the set includes at least one branch instruction after the call instruction in program order; and
store, in a memory included in the instruction fetch unit, an indication of whether the set includes at least one branch instruction.

4. The integrated circuit of claim 2, wherein the instruction fetch unit is configured to:
store the set of fetched instructions in a single cache line of the instruction cache.

5. The integrated circuit of claim 1, further comprising:
a branch prediction unit including the branch predictor circuit, wherein the branch prediction unit is configured to:
receive the value from the return stack, wherein the value is an indication of whether the set of fetched instructions includes at least one branch instruction after the call instruction in program order; and
based on the value, disable the branch predictor circuit for the one or more instructions.

6. The integrated circuit of claim 5, wherein the branch predictor circuit is one of a plurality of branch predictor circuits in the branch prediction unit, and wherein each of the plurality of branch predictor circuits is associated with a respective type of branch instruction; and
wherein the branch prediction unit is configured to:

receive an indication specifying that a first type of branch instruction is not located after the call instruction in program order; and disable the branch predictor circuit in response to the received indication value and the branch predictor circuit being associated with the first type of branch instruction.

7. The integrated circuit of claim 6, wherein the plurality of branch predictor circuits include:

a first branch predictor circuit configured to predict directions of conditional branch instructions corresponding to a first type of branch instruction; and a second branch predictor circuit configured to predict target addresses of indirect branch instructions corresponding to a second type of branch instruction.

8. The integrated circuit of claim 5, wherein the branch prediction unit is configured to disable the branch predictor circuit by preventing the branch predictor circuit from retrieving branch history information associated with the one or more instructions from a memory in the branch predictor circuit.

9. The integrated circuit of claim 5, wherein the branch prediction unit is configured to disable the branch predictor circuit by reducing a voltage supplied to the branch predictor circuit.

10. An integrated circuit, comprising:

an instruction fetch unit configured to:

fetch a set of instructions including a call instruction that causes execution of a subroutine having a return instruction, wherein fetching the set of instructions includes storing the set of instructions in an instruction cache;

prior to storing the set of instructions in the instruction cache, determine whether the set of instructions includes a first type of branch instruction after the call instruction; and in response to determining that the set does not include the first type of branch instruction and after returning from the subroutine, disable a first branch predictor circuit configured to predict an execution result of the first type of branch instruction, wherein the instruction fetch unit is configured to disable the first branch predictor circuit by storing a value in an entry of a return stack configured to predict a return address of the return instruction, and wherein the entry is associated with to the return address.

11. The integrated circuit of claim 10, wherein the instruction fetch unit is configured to:

determine whether the set of instructions includes a second, different type of branch instruction after the call instruction; and in response to determining that the set includes the second type of branch instruction after the call instruction, enable a second branch predictor circuit configured to predict an execution result of the second type of branch instruction.

12. The integrated circuit of claim 10, wherein the instruction fetch unit is configured to store the set of instructions in a single cache line of the instruction cache.

13. The integrated circuit of claim 10, wherein the instruction fetch unit is configured to:

write the value into the return stack in response to the call instruction being retrieved from an instruction cache.

14. A method, comprising:

a processor fetching a set of instructions including a call instruction that invokes a subroutine having a return instruction;

during the fetching, the processor determining whether the set of instructions includes any branch instructions located after the call instruction in program order;

based on the determining, the processor writing a value into a return stack of a branch prediction unit, wherein the value indicates whether a branch instruction exists after the call instruction, and wherein the value is written into an entry corresponding to a return address for the return instruction in the return stack; and based on the value and after returning from the subroutine, the processor reducing power consumption of the branch prediction unit in the processor, by disabling circuitry in the branch prediction unit.

15. The method of claim 14, wherein the determining includes identifying a type of branch instruction determined to be located after the call instruction that invokes the subroutine; and wherein the reducing includes disabling circuitry in the branch prediction unit that is used to predict an outcome of a type of branch instruction that is different from the identified type.

16. The method of claim 14, further comprising:

the processor storing the set of instructions in a cache line of an instruction cache, wherein a size of the set of instructions is the same as a size of the cache line.

17. The method of claim 14, wherein the determining includes determining that the set of instructions includes an unconditional branch instruction located before a conditional branch instruction and after the call instruction that invokes the subroutine; and wherein the reducing includes the processor reducing power consumption of the branch prediction unit upon returning from execution of the subroutine.

* * * * *